United States Patent [19]
Simpson, III

[11] Patent Number: 5,159,863
[45] Date of Patent: Nov. 3, 1992

[54] ADJUSTABLE FACE GROOVING TOOL HOLDER

[75] Inventor: Vandell E. Simpson, III, Kent, Ohio

[73] Assignee: Manchester Tool Company, Akron, Ohio

[21] Appl. No.: 693,391

[22] Filed: Apr. 30, 1991

[51] Int. Cl.$^5$ .............................. B23B 1/00; B26D 3/06
[52] U.S. Cl. .......................................... 82/1.11; 407/89; 407/101; 407/107
[58] Field of Search .................. 407/101, 111, 73, 74, 407/76, 78, 77, 81, 83, 89, 88, 90, 117; 82/1.11

[56] References Cited

U.S. PATENT DOCUMENTS

| | | | |
|---|---|---|---|
| 1,413,326 | 4/1922 | Dover | 407/89 |
| 3,125,798 | 3/1964 | Stein | 407/101 |
| 3,520,042 | 7/1970 | Stier | 407/89 |
| 3,611,525 | 10/1971 | Cochran | 407/113 |
| 3,802,042 | 4/1974 | Novlov | 407/101 |
| 4,332,513 | 6/1982 | Gowanlock | 407/120 |

FOREIGN PATENT DOCUMENTS

| | | | |
|---|---|---|---|
| 246004 | 10/1989 | Japan | 407/117 |
| 88103 | 3/1990 | Japan | 82/1.11 |
| 1268291 | 11/1986 | U.S.S.R. | 82/1.11 |

*Primary Examiner*—Steven C. Bishop
*Assistant Examiner*—Kevin J. Carroll
*Attorney, Agent, or Firm*—Watts, Hoffmann, Fisher & Heinke

[57] ABSTRACT

This invention relates to an adjustable face grooving tool holder adaptable for holding a cutting insert for cutting circular face grooves having widely differing diameters in the end face of a workpiece without interchanging tool parts.

15 Claims, 5 Drawing Sheets

ADJUSTABLE FACE GROOVING TOOL HOLDER

BACKGROUND OF THE INVENTION

1. Field of the Invention

This invention relates generally to the field of machine tool equipment, and more particularly to a face grooving tool holder adaptable for holding a cutting insert for cutting circular face grooves having widely differing diameters in the end face of a workpiece without interchanging tool parts.

2. Background Art

A well known machine tool operation is known as "face grooving." Face grooving is an operation for cutting a circular groove in the end face of a metal workpiece. In such an operation, a tool holder apparatus, bearing a small cutting element called an "insert," is mounted on a machine tool and is utilized in a manner described in more detail below.

A workpiece defining a generally longitudinal axis is clamped into a rotatable chuck of the machine tool. The machine tool includes power drive apparatus for rotating the chuck such that the workpiece rotates substantially about its longitudinal axis.

The tool holder, carrying the cutting insert, is supported by the machine tool so that the cutting insert extends generally toward the end face of the workpiece mounted in the chuck. The machine tool includes apparatus for translating the tool holder, and thus the cutting insert, transversely of the axis of rotation of the chuck and for moving the tool holder axially of the chuck, i.e., toward and away from the end face of the workpiece.

In a face grooving operation, the workpiece is mounted in the chuck and the chuck is power driven to rotate the workpiece. The tool holder is translated, relative to the rotational axis, to a location at which, when advanced against the end face of the workpiece, the cutting insert will scribe, or cut, a groove of a desired diameter in the workpiece end face. When the cutting insert is positioned at the desired displacement from the rotational axis, the cutting insert is advanced against the end face of the workpiece, and a groove is cut in the workpiece end face. The diameter of the end face groove is dependent upon the degree of displacement of the cutting insert from the axis of rotation.

Figure 1A:
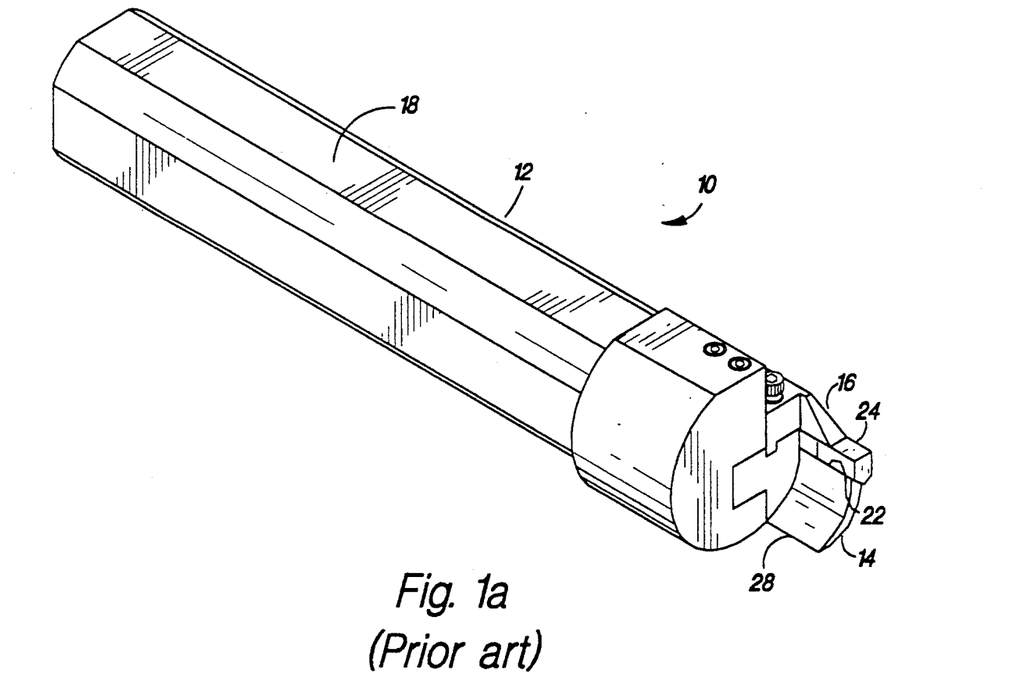
FIG. 1a is a perspective drawing of a prior art face grooving tool holder.

Since the present invention relates specifically to a tool holder assembly, a prior art face grooving tool holder is now described, with particular reference to FIG. 1a. The tool holder, generally designated at 10, includes three main parts: a main body 12, a support blade 14 and a clamping arm 16.

The main body 12 is a heavy piece of steel adapted to firmly support the remaining portions of the tool holder. The main body is configured to define flats, such as 18, which facilitate its firm mounting in the machine tool. The main body portion also defines a recessed portion 20, adapted for accommodating the blade 14 and the clamping arm 16.

The blade is demountably attachable to the main body portion 12 by means of known fasteners, such as screws. Likewise, the clamping arm is removably mountable on the main body portion in a location such that the clamping arm bears down on the upper surface 22 of the blade 14.

In use, a cutting insert 24 is placed atop a recess in the upper surface 22 of the blade. The clamping arm is then applied and fixed in place such that the lower edge 28 of the clamping arm, in cooperation with the upper edge of the blade, holds the cutting insert 24 firmly in place. The cutting insert can easily be removed and replaced by simply loosening the clamping arm, replacing the cutting insert and retightening the clamping arm in its fixed position.

A prior art tool holder is illustrated and described in U.S Pat. No. 3,611,525, issued Oct. 12, 1971 to Cochran. A cutting insert of known design is illustrated and described in U.S. Pat. No. 3,802,042, issued Apr. 9, 1974 to Novkov. Both of these issued United States patents are hereby expressly incorporated by reference.

It can be seen in FIG. 1a that the support blade 14 exhibits a curvature. The curvature is desirable because, during a face grooving operation, the blade, in the course of firmly supporting the cutting insert, actually protrudes with the cutting insert into the groove which is being cut. Since the groove is circular in configuration, it is desirable that the blade have a radius of curvature similar to that of the face groove being cut. If the blade were not so curved, portions of the blade would impinge, during cutting, against the inside or outside walls of the face groove.

It has been proposed, as an alternative to curving the blade, to simply use a blade with a shorter dimension from its top surface 22 to its trailing edge 28. This has not been entirely successful, however, because such a configuration results in a blade having mechanical strength characteristics inferior to that of curved blades such as are described above.

Another proposed alternative is to taper the trailing edge 28 of the blade, in order to afford more clearance between the trailing edge of the blade and the inside and outside walls of the face groove being cut, to allow use with a range of groove diameters. This increases the cost of machining the blades, and also reduces the blade strength.

Due to the fact that the curvature of the curved blade is fixed and cannot be changed, and only a limited clearance is available between the groove walls and the blade width, a particular blade can cut face grooves having diameters which can vary only slightly. For example, a typical single curved blade for cutting small diameter grooves is adaptable for cutting face grooves having diameters of only between 2 inches and 2¼ inches and for example, a single blade for cutting large diameter grooves can cut grooves ranging between 12 and 18 inches in diameter.

Figure 1B:
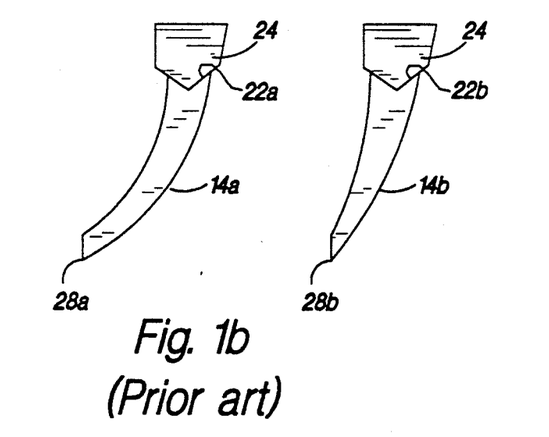

Clearly, a problem arises when one wishes to cut face grooves of widely differing diameters. In the past, it has been proposed to facilitate this by employing a set of support blades having different curvatures in order to accommodate the cutting of grooves of widely differing diameters. Two blades 14a, 14b of a set of such blades having different curvatures are illustrated in FIG. 1b. The blades have top surfaces 22a, 22b and trailing edges 28a, 28b. In order to afford the versatility of cutting face grooves of different diameters, e.g., grooves between 2.5 inches and 18 inches in diameter, a set of several different blades having differing curvatures had to be provided, for example, four to six blades to cover the above-mentioned range. The necessity of providing these additional support blades increased considerably the cost of the tooling apparatus and inventory required.

Additionally, the necessity for changing cutting blades when changing cutting diameters increased labor costs and down-time in the face grooving operation.

It is an object of the present invention to provide a face grooving tool holder which is adaptable for cutting face grooves of widely varying diameter without the necessity for providing multiple support blades.

DISCLOSURE OF THE INVENTION

The disadvantages of the prior art are reduced or eliminated by a tool holder that includes a main body, a support blade and a clamping arm adapted for mounting near the support blade, or a one-piece support blade and clamp, for accommodating and holding a cutting insert. In accordance with a general aspect of the invention, the tool holder includes apparatus for supporting the blade for movement relative to the main body while retaining the support blade mounted on the main body.

In accordance with a more specific aspect of the invention, the relative motion between the blade and the main body is rotative motion. Apparatus is provided for locking the blade against rotative motion at a particular angular position.

More specifically, the main body has a configuration defining an axis, and the motion executed by the blade relative to the main body is rotative motion about an axis substantially parallel with the body's defined axis.

In one embodiment the axis of rotative motion of the blade is substantially parallel with an elongate axis of the supporting body. In an alternative embodiment, the axis of such rotation is perpendicular to the elongate axis of the main body.

In the preferred embodiments the tool holder includes apparatus for limiting the total excursion of angular displacement of the relative rotative motion to about 10°.

In a specific preferred embodiment, the axis of relative rotation passes through an outer corner of a cutting insert which is mounted in the tool holder.

These and other features of the present invention will be more fully understood by reference to the following detailed description, and to the drawings, in which:

BRIEF DESCRIPTION OF THE DRAWINGS

FIG. 1b is an end view illustrating two differing blade components of the tool holder of FIG. 1a;

BEST MODE FOR CARRYING OUT THE INVENTION

Figure 2:
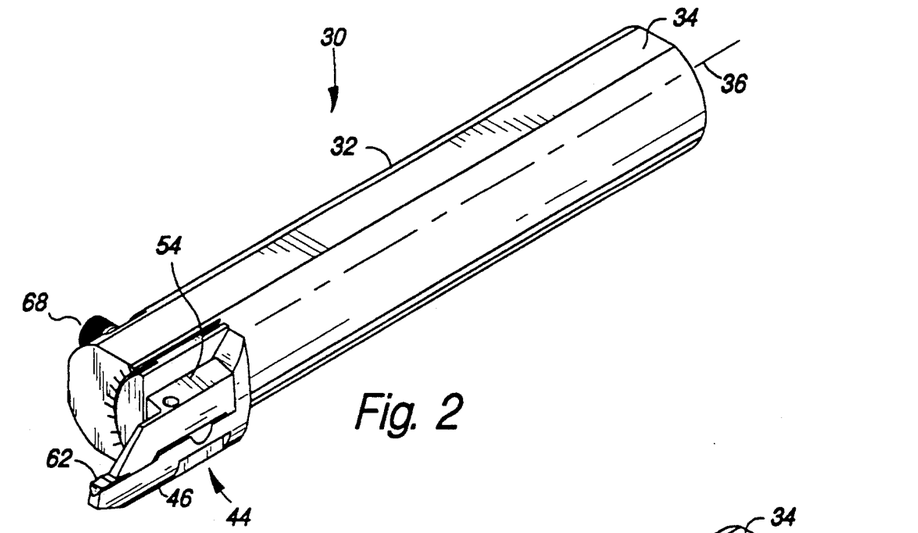
FIG. 2 is a perspective view illustrating a face grooving tool holder incorporating the present invention.
Figure 3:
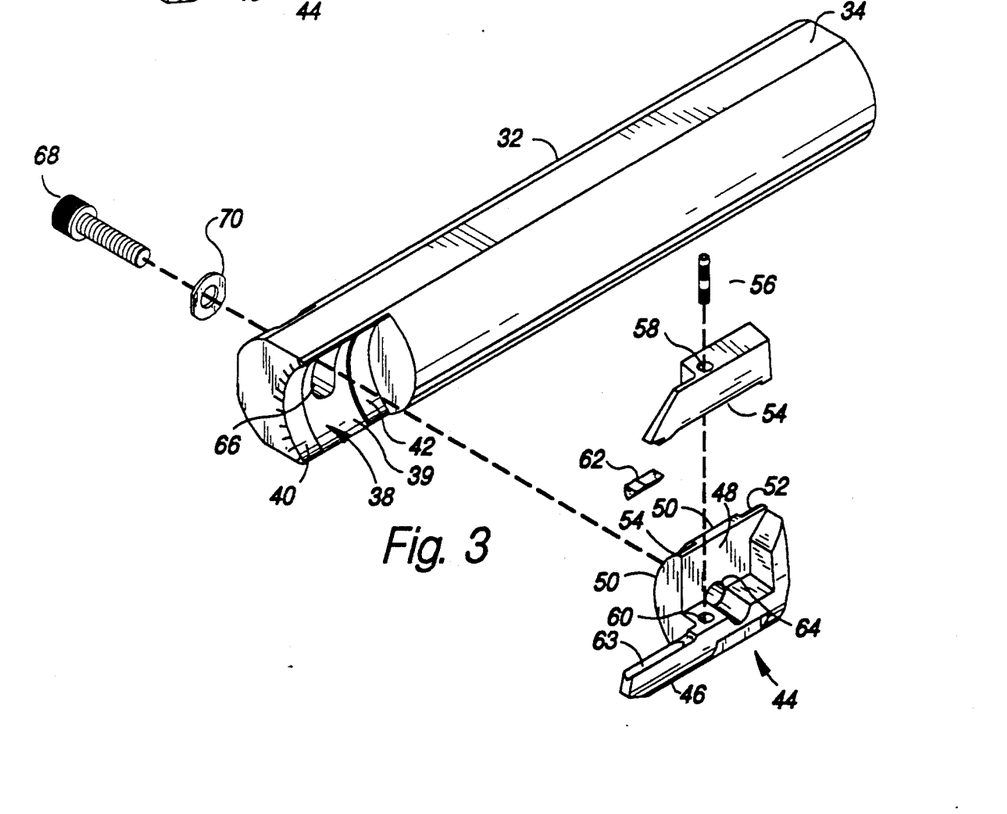
FIG. 3 is an exploded view of the tool holder of FIG. 2.
Figure 5:
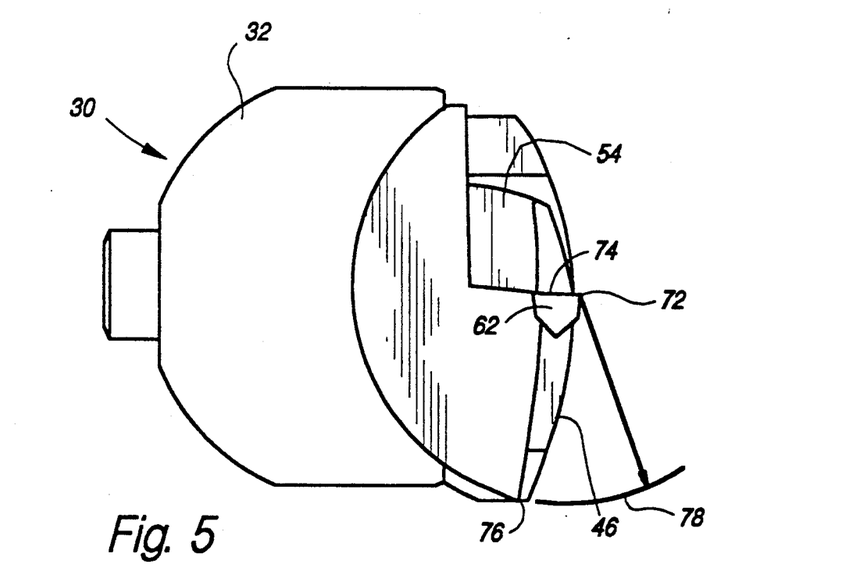
FIG. 5 is an end elevational view of the tool holder of FIG. 2, illustrating a principle of its operation.

FIGS. 2, 3 and 5 illustrate the overall construction of a face grooving tool holder having facility for adjusting the angular position of its blade in order to accommodate the cutting of face grooves having widely differing diameters without the necessity for interchanging blades.

The tool holder is generally designated by the reference character 30. The tool holder includes a main body portion 32 consisting of a shaped piece of heavy steel material having great mechanical strength. The main body portion defines flats, such as indicated at 34, for facilitating the firm mounting of the body portion in a machine tool in which it is to be used. The main body portion 32 has an elongated configuration, and defines a generally longitudinal, or elongate, axis such as illustrated at 36 in FIG. 2.

The main body portion defines at one end a recessed pocket 38. The main wall 39 of the pocket defines an inwardly curved segment of a cylinder having an axis substantially parallel to the elongate axis 36 of the main body 32. The pocket also defines a pair of shoulder portions 40, 42 which are slightly raised with respect to the main interior wall portion 39 of the pocket 38.

The tool holder also includes a blade unit 44, which is most clearly represented in FIG. 3. The blade unit 44 includes a support blade portion 46 and a block portion 48. The blade portion 46 and the block portion 48 are integrally formed of a single piece of metal.

An outer surface 50 of the block portion 48 defines an outwardly curved segment of a cylinder having a radius of curvatures substantially the same as that of the wall 39 of the pocket 38. The outer wall of the block portion also defines a pair of recessed notches 52, 54, which are alignable with the shoulder portions 40, 42 of the pocket.

When the block portion of the blade unit 44 is nested within the pocket 38, the entire blade unit 44 can rotate with respect to the main body portion 32. The axis of such rotation is substantially parallel to the elongate axis 36 of the main body. The notches 52, 54 cooperate with the shoulder portions 40, 42 to prevent axial movement of the blade unit 44 when it is engaged in the pocket 38.

A clamping arm 54 is also provided. The clamping arm is adapted to be removably fastened atop the blade portion 46, by means of a screw 56 which extends through a vertical threaded hole 58 in the clamping arm and engages the blade portion in an oppositely threaded hole 60.

A cutting insert 62 is positioned between the clamping arm 54 and an upper surface concave 63 of the blade portion 46. When the cutting insert is placed between the clamping arm and the support blade portion, and the clamping arm is tightened down, the cutting insert is firmly secured between the clamping arm and the blade portion.

The blade unit 44 defines a tapped hole 64 extending laterally therethrough. The pocket 38 of the main body defines a lateral slot 66 extending therethrough. When the blade unit 44 is nested within the pocket 38, the hole 64 aligns with the slot 66. This alignment enables an operator to removably secure the blade unit 44 in the pocket 38 by means of a screw 68 and a washer 70. The screw 68 engages with threads (not shown) of the hole 64 in the blade unit 44.

In use, the blade unit 44 is secured within the pocket 38 by the screw 68. When the screw is tightened, the screw, in cooperation with the washer 70, locks the blade unit 44 against rotational motion. When the screw is loosened, the blade unit can be rotated relative to the main body about the axis of the surfaces 52, 54 over a range of angular positions. The length of the slot 66 defines the limit of excursion of angular displacement of the blade unit 44 with respect to the main body 32. In the preferred embodiment, the length of the slot 66 is chosen such that the total range of angular displacement possible with the locking screw in place is approximately 10 degrees.

The height, width and curvature of the blade position 46 of the blade unit, and the side clearance provided for the blade portion by the width of the cutting edge of the supported cutting insert, vary with cutting inserts of different widths; but the parameters are selected to provide adequate support strength for the cutting insert and adequate side clearance so the blade portion 46 does not intentionally contact the sidewalls of any diameter face groove being cut, throughout the range of adjustment provided by the blade unit. Thus, it will be appreciated that a single blade unit may not accommodate all desired insert widths (and, hence, all desired groove widths) even though it may otherwise adjust to accommodate the groove diameter. The same of course is true of prior art fixed blades.

Referring to FIG. 5, there is shown therein an end view of the tool holder assembly illustrated in FIGS. 2 and 3. This view shows the cutting insert 62 held between the clamping arm 54 and the blade portion 46. An important aspect of the preferred embodiment, as shown in FIG. 5, is the location of the axis of rotation of the blade unit at the outer corner or end 72 of a cutting edge 74 of the cutting insert 62. The axis of rotation is to be considered an axis perpendicular to the plane of the paper in FIG. 5 and as extending through the outer insert corner 72. The movement of the extremity of a trailing edge 76 of the blade portion 46 is defined by an arc 78, whose center coincides with the corner 72.

While the location of the rotational axis of the blade unit 44 preferably intersects the outer corner of the cutting edge of the cutting insert, other locations of this axis are possible and will provide a workable tool holder. Excessive displacement of the rotational axis, however, from the cutting insert will complicate tool holder set-up and the selection of desired tool holder location. The axis of rotation should preferably be proximate the cutting edge 74 of the cutting insert 62, such as at its outer corner, inner corner, or intermediate between the corners along the cutting edge.

Figure 4A:
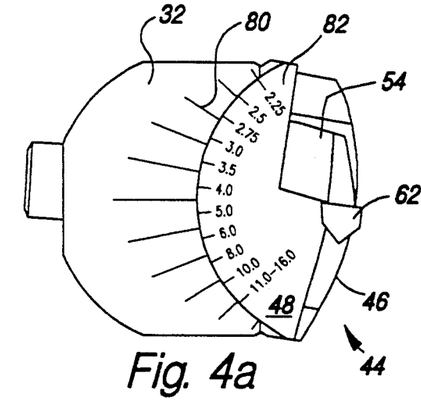
FIGS. 4a–4c are detail end elevational views illustrating a detail feature of the tool holder of FIG. 2.
Figure 4B:
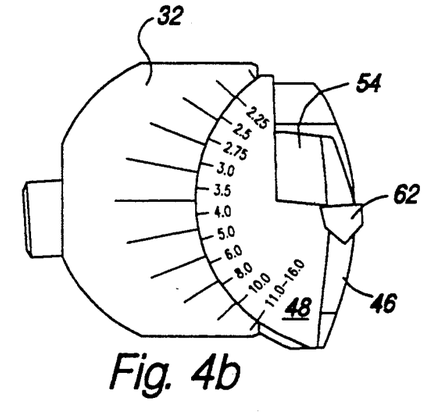
Figure 4C:
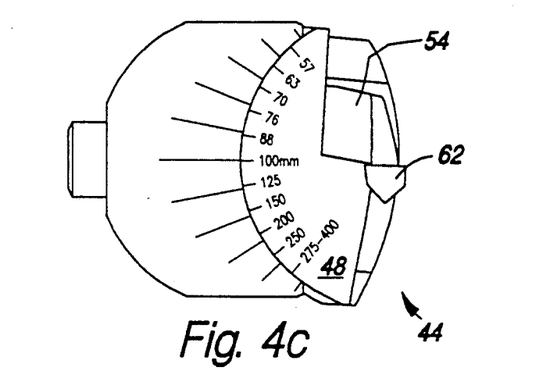

FIGS. 4a–4c illustrate a particular type of vernier indexing embodiment for adjusting the angular displacement of the blade unit 44 of the tool holder to accommodate the cutting of face grooves of differing diameters. Each of FIGS. 4a–4c is a detailed end view showing a first set 80 of indicia inscribed on the end of the main body portion 32, and a second set 82 of indicia which are inscribed on the end of the block portion 48 of the blade unit 44. The angular displacement defined between adjacent indicia of the set 80 is about 10°, i.e., the full excursion of possible rotative movement of the blade unit 44 with the locking screw 68 in place loosened to permit movement.

The vernier system defined by the respective sets of indicia 80, 82 is of known type. In order to select an angular position of the blade unit 44 for cutting a face groove of a predetermined diameter, an operator loosens, but does not remove, the locking screw 68, and rotates the blade unit 44 to a position at which the dimension of the set 82 most closely approximating the desired diameter is positioned precisely opposite one of the indicia associated with the set 80. When the correct rotational displacement has been selected, the operator simply tightens the locking screw 68 to secure the blade unit 44 against further rotational displacement.

In FIGS. 4a and 4b, the indicia of the set 82 are set forth in inches of face groove diameter. In FIG. 4c, the indicia set 82 is displayed in metric units.

It can be seen that, in FIG. 4a, the rotation of the block portion 48 is such that the index corresponding to 2.25 inches of face groove outside diameter is exactly aligned with one of the indicia of the set 80. In such a condition, the adjustable face grooving tool holder is set up to facilitate a cut of a face groove having an outside diameter of approximately 2.25 inches. In FIG. 4b, the adjustable tool holder is illustrated as being set up to facilitate cutting a face groove having an outside diameter of between 11 and 16 inches. In FIG. 4c, the adjustable tool holder is illustrated as being set up to facilitate cutting a face groove having an outside diameter of approximately 100 millimeters.

As can be seen from the details of FIGS. 4a–4c, the adjustable face grooving tool holder of the present invention can accommodate to cutting face grooves as small as 2.25 inches in outside diameter and as large as 16 inches in outside diameter, all with no necessity for replacing or interchanging support blades. Prior art tool holders, including a set of six blades of differing curvature necessary to accommodate cutting the identified range of face groove diameters, cost approximately three to four times the cost of the tool holder of the present invention. Additionally, machine tool downtime is reduced by obviating the need for changing blades between cuts of different diameters.

Figure 6A:
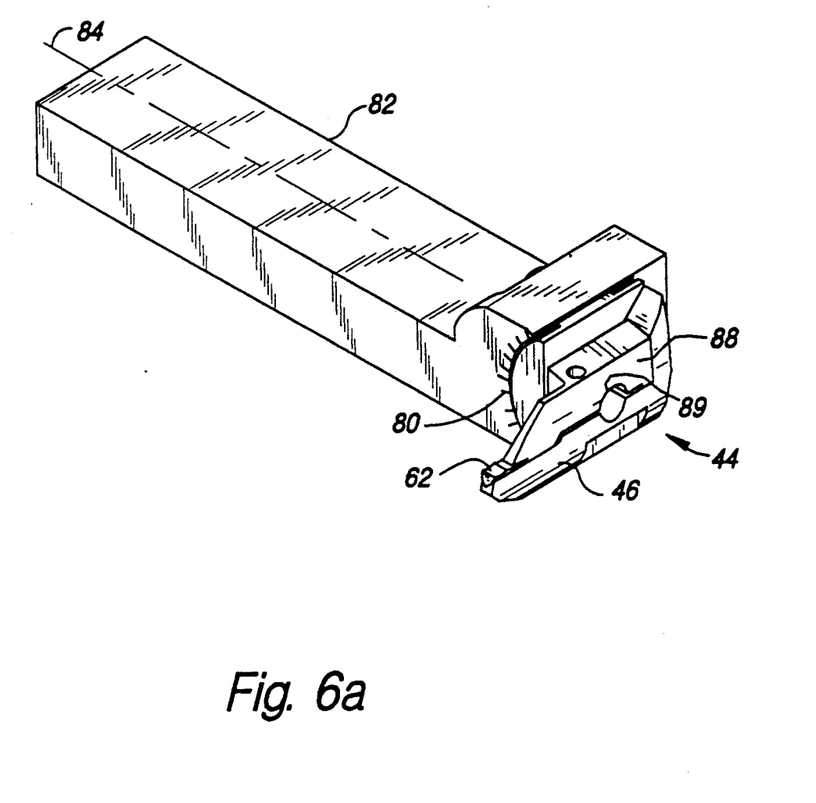
FIG. 6 is a perspective view of an alternate embodiment of the present invention.
Figure 6B:
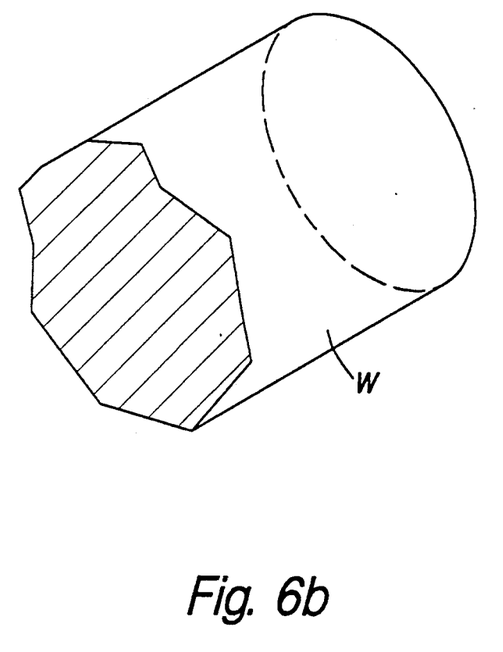

FIG. 6 illustrates an alternative embodiment of the present invention. In the preferred embodiment described above with reference to FIGS. 2 and 3, the tool holder is designed to be supported with its elongate axis 36 substantially parallel to the axis of rotation of the workpiece. In the embodiment of FIG. 6, the tool holder is designed such that an elongate axis 84 of the main body portion 82 is disposed substantially perpendicular to the axis of the rotation of the workpiece W. That is, the main body 82 is supported substantially displaced from the axis of a rotation, and the direction of the cut made by the cutting insert 62 is substantially perpendicular, rather than parallel, to the axis of the main body. For purposes of accommodating angular adjustments, the blade unit 86 uses a modified, clamping arm 88 having an opening 89, the headed screw 68 is replaced with a headless right and left hand socket screw, (not shown), and the washer 70 is replaced with a thin, internally threaded, nut (not shown). Access to the screw is provided from the blade side of the unit through the semi-cylindrical opening 89 in the clamping arm and the hole 64 of the blade unit 44. The nut that replaces the washer 70 has a thread of opposite hand from the thread of the hole 64. Access to the socket end of the locking screw is through the opening 89 and rotation draws the nut and unit 44 together to clamp the unit to the main body in desired positions.

Although the embodiments of the present invention have been described in detail, it is to be understood that those of ordinary skill in the relevant technical field will be able to make certain additions or modifications to, or deletions from, the particular embodiments shown here without departing from the spirit or the scope of the invention defined in the following claims. For example, the separate support blade and clamping arm can be replaced with a support blade having a self-gripping recess that receives and holds a cutting insert without a separate clamping arm. Also, the curvature of the support blade will in certain instances, such as when a face groove is formed in a surface from which a central hub extends, curve in the opposite direction from that of the blades shown and described in connection with the specific embodiments disclosed.

I claim:

1. An end face grooving tool holder comprising:
   a) an elongated main body defining a longitudinal first axis;
   b) means including a support blade for supporting and gripping a cutting insert against an end face of a workpiece;
   c) means for supporting said support blade for rotation relative to said main body, said rotation being about said first axis, and
   d) means for selectively locking said support blade during face grooving at one of a plurality of angular displacements.

2. The tool holder of claim 1, further wherein said supporting means includes means for locking said blade against said relative rotation at a predetermined angular displacement.

3. The tool holder of claim 1, wherein:
   a) said means for supporting and gripping a cutting insert define a cutting insert holding location; and
   b) said first axis intersects said cutting insert holding location.

4. The tool holder of claim 3, wherein:
   said first axis substantially intersects a cutting edge of a cutting insert when held at said cutting insert holding location.

5. The tool holder of claim 1, wherein:
   said blade defines a curved configuration, the curvature being substantially about an axis substantially parallel to said first axis.

6. The tool holder of claim 1, further comprising:
   structure for limiting the total excursion of angular displacement of said relative rotation of said blade to approximately 10 degrees.

7. The tool holder of claim 1, further comprising:
   vernier indicia for indicating the angular displacement of said relative rotation.

8. An end face grooving tool holder comprising:
   a) an elongated main body defining a first longitudinal axis and, a pocket in the main body having a concave curved surface which defines a portion of a cylinder having an axis substantially parallel to said first axis;
   b) a blade unit having (i) means including a support blade for supporting and gripping an end face cutting insert, and (ii) a block portion, said block portion having a convex curved portion defining a portion of a cylinder having a radius of curvature substantially equal to that of said concave curved surface defined by said pocket, said block portion being nestable in said pocket for facilitating relative rotation of said blade unit with respect to said main body about a second axis substantially parallel to said first axis; and
   c) means for retaining said block portion rotatably nested in said pocket and for selectively locking said block portion and support blade against rotation with respect to said main body at a predetermined angular position.

9. The tool holder of claim 8, further comprising:
   structure for limiting the total excursion of angular displacement of said relative rotation of said blade unit to about 10 degrees.

10. The tool holder of claim 8 wherein:
    said second axis defined by said convex curved portion of said block portion of said blade unit substantially intersects a location at which said end face cutting insert can be accommodated and held by said means for supporting and gripping an end face cutting insert.

11. A method of cutting two end face grooves having different diameters, said method utilizing a machine tool having a workpiece holder, means for supporting a tool holder, said tool holder having a main body defining a longitudinal first axis and a curved end face cutting insert support blade, and an end face cutting insert held by said blade, said method comprising the steps of:
    a) supporting said tool holder on the machine tool with said end face cutting insert facing toward an end face of a workpiece;
    b) rotating one of said workpiece holder and tool holder about an axis substantially parallel to said first axis;
    c) advancing one of said workpiece holder and tool holder toward the other to bring the cutting insert and workpiece into mutual contact to cut a groove having a first diameter in said end face;
    d) retracting one of said workpiece holder and tool holder away from the other;
    e) thereafter (i) rotatably adjusting the angular displacement of said blade relative to said main body by rotation about a second axis substantially parallel to said first axis; (ii) locking said blade against further rotation;, (iii) translating one of said workpiece holder and tool holder relative to the other, (iv) advancing one of said workpiece holder and tool holder toward the other, and (v) rotating one of said workpiece holder and tool holder about an axis to cut an end face groove having a second diameter different from said first diameter.

12. AN end face grooving tool holder comprising:
    a) an elongated main body defining a first longitudinal axis;
    b) a support blade;
    c) a clamping arm adapted for mounting proximate said support blade for accommodating and holding an end face cutting insert against said support blade;
    d) apparatus for supporting said blade for rotative movement relative to said main body about a second axis substantially parallel to said first axis while retaining said support blade mounted on said main body, and
    e) apparatus for selectively locking said blade against further rotating while cutting occurs.

13. A tool holder suitable for grooving the end face of a workpiece about a first axis with respect to which either the tool holder or the workpiece is rotatable, comprising:
    a) a body supportable on a machine tool;
    b) means including a support blade for supporting and gripping an end face cutting insert;
    c) means connecting the insert supporting and gripping means to the body for angular adjustment relative to the body about a second axis substantially parallel said first axis, and
    d) apparatus for selectively holding said blade at a constant angular position during cutting.

14. In a method of cutting circular end face grooves of different diameters in end faces of workpieces using a cutting insert held on a narrow, curved support blade, comprising the steps of relatively rotating the cutting insert and a workpiece about a first axis, locating the support blade at a first radial distance from said first axis and feeding the workpiece or the insert and blade toward the other; and thereafter locating the support blade at a second radial distance from said first axis, rotatably adjusting the support blade angularly about a second axis parallel to said first axis, locking said blade against further rotation about said second axis, and feeding the workpiece or the insert and blade toward the other.

15. The method of claim 14 wherein the support blade is adjusted to a position where it conforms substantially to the curvature of the end face groove to be cut.

* * * * *